SEATS

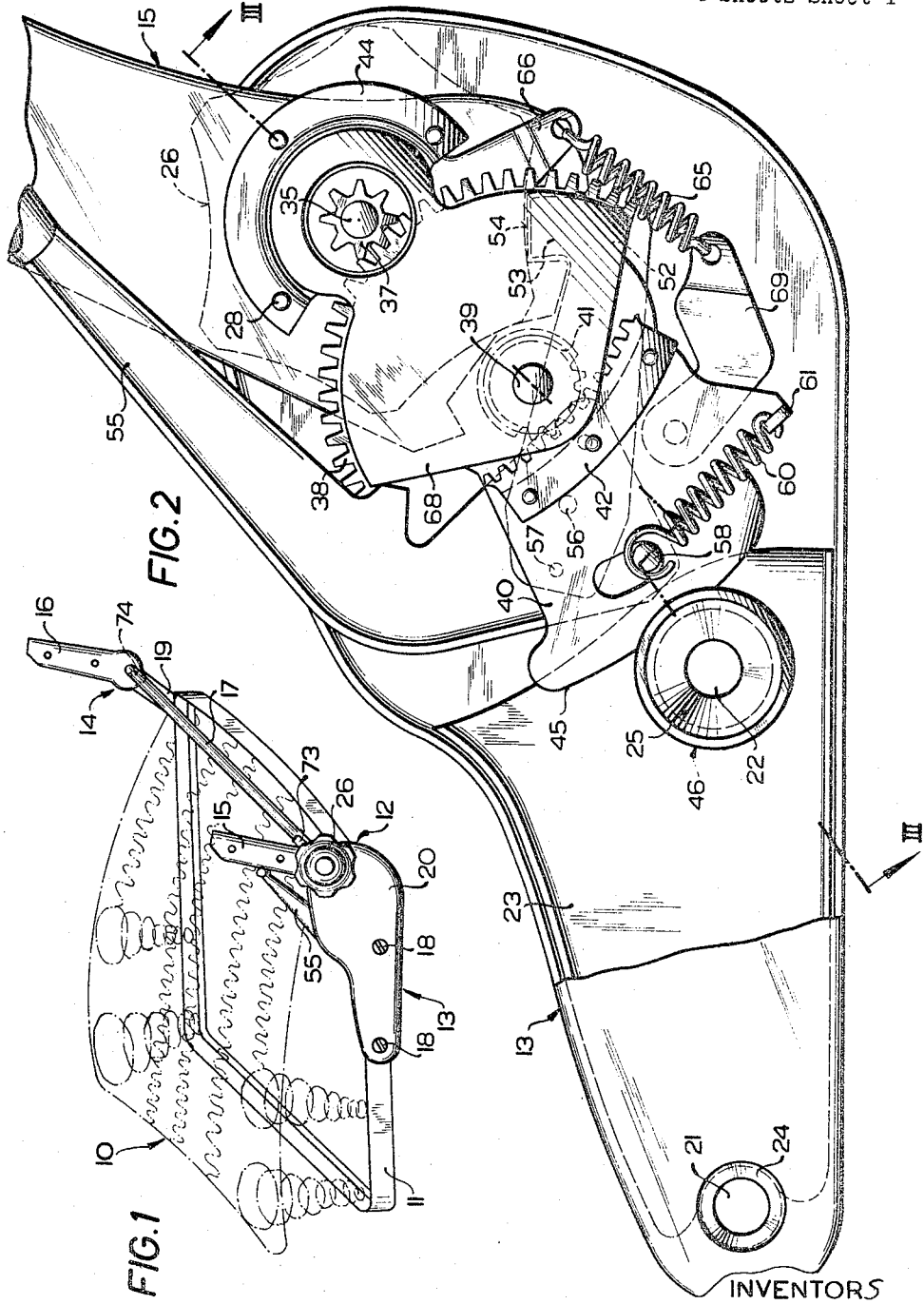

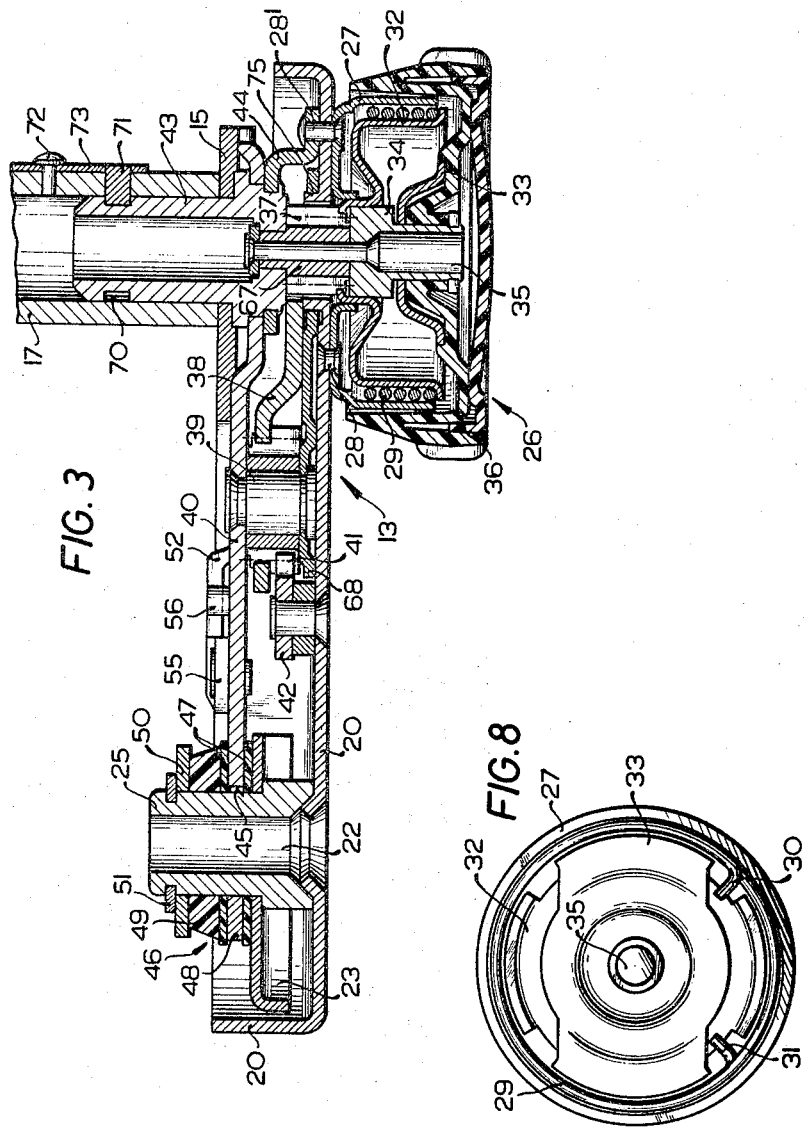

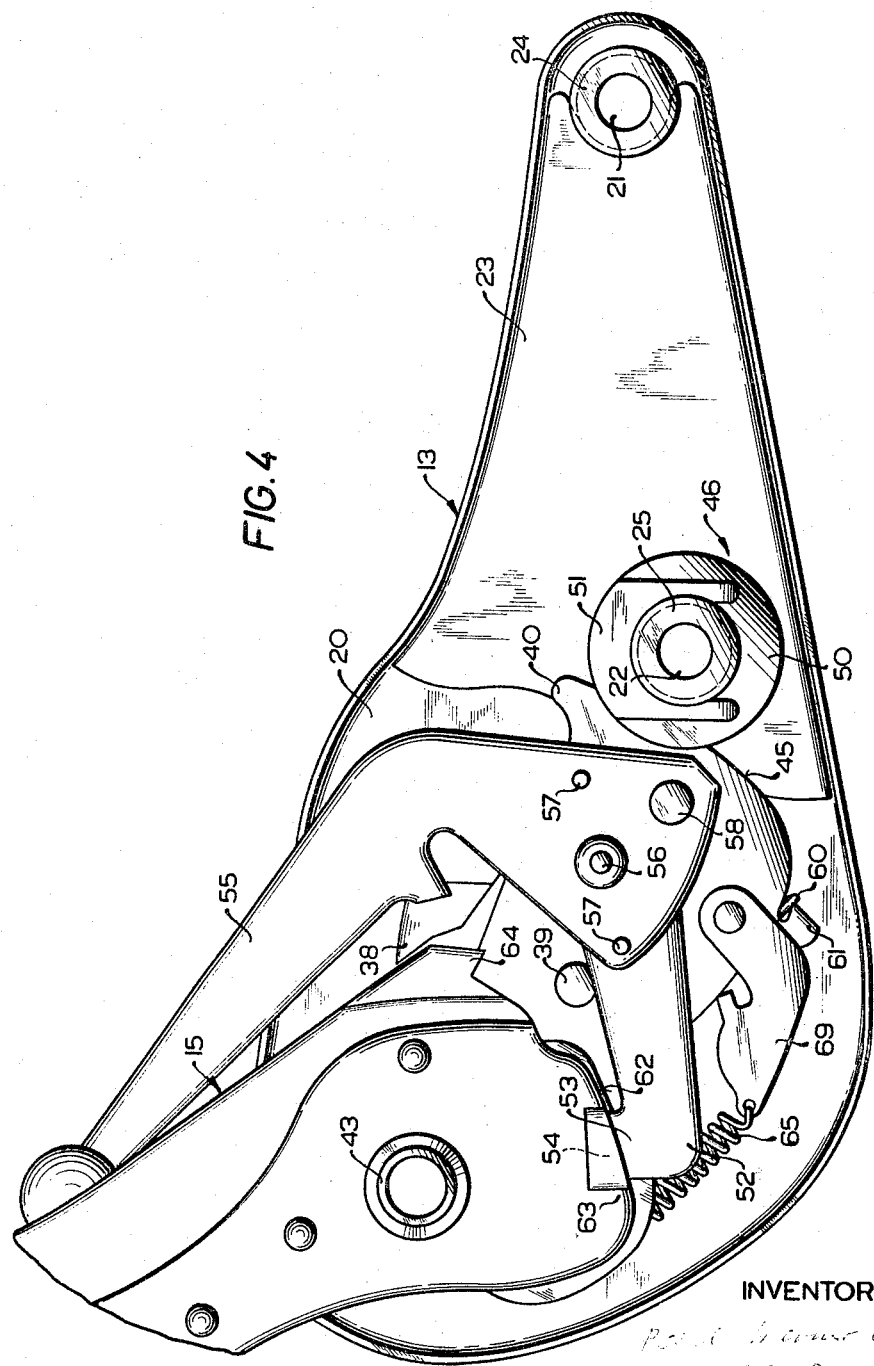

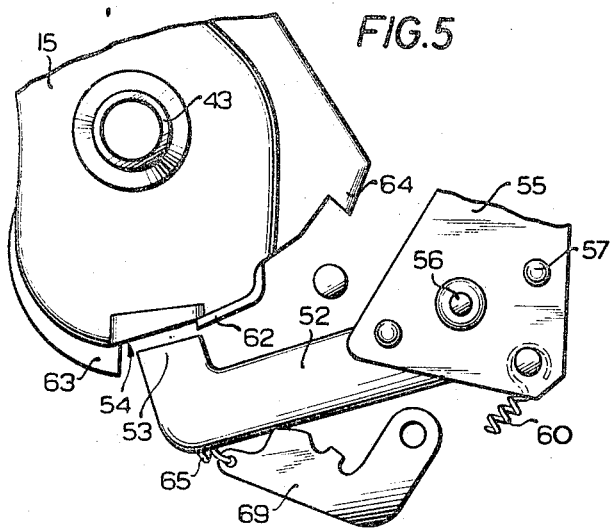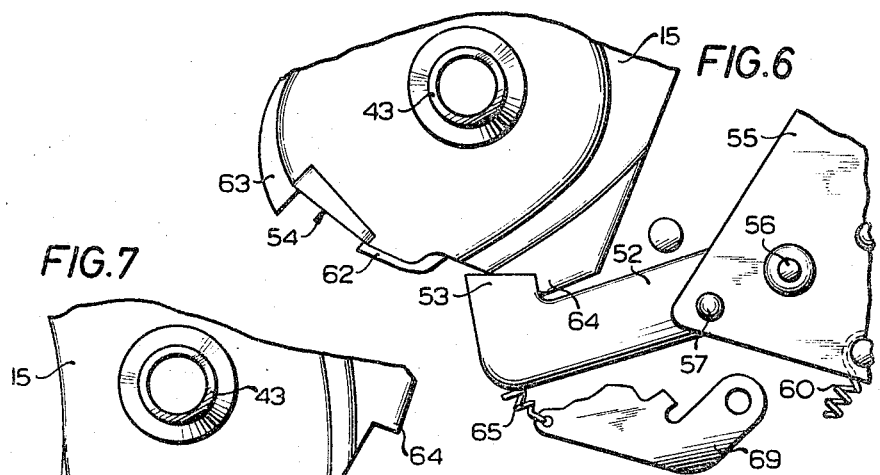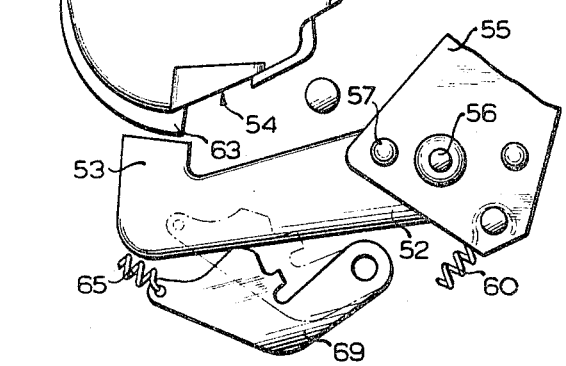

Paul Werner, Remscheid-Hasten, and Gustav Adolf Reinmöller, Remscheid, Germany, assignors to Fritz Keiper, Remscheid-Hasten, Germany, a firm
Filed Nov. 17, 1965, Ser. No. 508,230
Claims priority, application Germany, Nov. 17, 1964, K 54,550
17 Claims. (Cl. 297—362)

This invention relates to seats, particularly vehicle seats.

An object of the invention is to provide a seat, particularly a motor vehicle seat, having a seat portion, a seat back and means for adjusting the relative angular position of the seat back with respect to the seat portion, said seat portion and seat back each having a frame and said frames being connected at one side by a pivot bearing and at the other side by the adjusting means, said adjusting means comprising a two-part hinge fitting; locking means adapted to lock the two parts of the hinge fitting against relative displacement; first operating means adapted to actuate the locking means to release said hinge fitting parts and permit the seat back to be freely pivotable with respect to the seat portion; means adapted to re-engage automatically the locking means, after said locking means have been released, when the seat back is pivoted to a substantially upright position with respect to the seat portion; fine adjusting means adapted to adjust the relative angular position of the seat back with respect to the seat portion between two limit positions determined by the position to which the seat back is pivoted when said locking means are released; and second operating means for operating the fine adjusting means.

By constructing a seat according to the invention, particularly a seat for a motor vehicle, the occupant of the motor vehicle is able to adjust the seat back to suit his wishes. Thus, with the fine adjustment means provided, he can adjust the seat back on an infinitely variable scale within a relatively wide range of angles. For example, this makes it possible for the driver to move the seat back into a position which is most suitable for him to drive the vehicle. In contrast, the passenger can for example, by using the fine adjustment facility, move the back to a position of relaxation which may be somewhere between the upright sitting position and the reclining position. A further substantial advantage resides in the fact that the fine adjustment has its own operating means, preferably in the form of a handle so that only this need be operated if a fine adjustment of the seat is desired. On the other hand, the construction according to the invention also offers the advantage that the seat back can be quickly moved into an entry or reclining position, which is done manually, by freely pivoting the seat back once the locking means have been disengaged. When the seat back is returned to the sitting or substantially upright position, there is the further advantage that the locking means automatically engage in the pre-selected sitting position and so produce further arresting of the two parts of the hinged mounting. The locking means re-engage regardless of the position of the fine adjustment means.

In a preferred embodiment of the invention, the fine adjustment means include a pivotable swinging arm which, on the one hand, carries the locking means rigidly connected to the handle and, on the other hand, a gearwheel which in turn co-operates with a toothed segment pivotable through a fine adjustment gearwheel, and with a fixed toothed arc. The aforesaid components serve to convey the force exerted on the handle of the fine adjustment means or the movement performed thereby to the pivoting part of the hinged fitting so that, as desired, and in fact on an infinitely variable basis, the back of the seat can be finely adjusted.

According to a further proposal within the scope of the invention, the locking coupling co-operates directly with the pivotable part of the hinge fitting. This has the substantial advantage that any auxiliary intermediate members are entirely unnecessary. It is expedient for the pivotable part of the hinge fitting to have a recess in which the locking means can engage. The locking means may include a lever having a hook-shaped end which can engage in the recess. Furthermore, it is expedient for limiting walls of this recess to merge into projections of different lengths disposed on diametrically opposed sides. The shorter of these two projections will then pass underneath when the seat back is to be moved from the reclining position to the entry position. If, in contrast, the seat back is to be moved from the seating or substantially upright position to the reclining position, then the locking coupling must travel a longer distance so that it can pass under the longer projection. In the latter-mentioned case, in other words when the seat back pivots freely into the reclining position, the locking coupling at the same time pivots a rocker, loaded by a spring and mounted on the swinging arm.

It is preferred, following the shorter projection of the pivotable part of the hinge fitting and in fact at an interval therefrom, to provide a further projection to serve as an abutment for the hook of the locking coupling. The interval before this second projection is so selected that abutment occurs when the seat back is in the position for the occupant to enter the vehicle.

It has already been stated that in the case of manual pivoting of the back from the entry or reclining position into the sitting position, the locking coupling automatically engages in the recess provided therefor. In order to achieve this, the swinging arm is loaded by a spring which, in the sitting position of the seat back, holds the locking coupling carried by the swinging arm in its locked position. One end of the loading spring can be attached to an expediently angled eyelet-shaped part of the swinging arm itself, whilst its other end is attached to a pin attached to the handle for the locking coupling and passing through an elongated aperture or hole in the swinging arm.

According to a further proposal of the invention, the gearwheel associated with the swinging arm is mounted on a pin which is carried not only by this swinging arm but is carried by a further swinging arm arranged at an interval from the first and substantially parallel therewith. The last-mentioned swinging arm is pivotally mounted on a raised edge or rim of the inner wall of one member of the hinged fitting, thus obviating the need for additional means of securing this second swinging arm.

According to a further proposal of the invention, a part of the first swinging arm is constructed to serve at the same time as part of a brake. Above all, this is intended to exclude any undesirable movement of the swinging arm and any flapping which may be occasioned thereby. At the same time, that part of the swinging arm which serves as a brake is guided. It is advisable to clamp between two discs arranged on a bearing sleeve of the hinge fitting the end of the swinging arm which is of arcuate shape in respect of the pivot point of the said arm. The aforesaid discs can be made from synthetic plastic material, for example polyamide. The two discs are spaced from each other on the bearing sleeve by a spacer which similarly encloses the bearing sleeve or, in other terms, the thickness of the spacer is less than the thickness of that part of the swinging arm which acts as a brake. In order to exert pressure on the brake, it is advisable, on one side of one of the discs, to dispose a preferably conical resilient member which is kept pre-tensed by a retaining member, a rigid disc or washer being interposed.

According to a further proposal of the invention, the first swinging arm is at the same time pivotally mounted on the swivel and bearing pivot of the hinge fitting parts, so that equiaxial arrangement of these parts is ensured.

The invention will now be described in detail, by way of example, with reference to the accompanying drawings, in which:

FIG. 1 is a diagrammatic representation of a motor vehicle seat constructed according to the invention having a frame provided with springs;

FIG. 2 shows as adjusting means for the hinged fitting shown in FIG. 1, shown from outside of the motor vehicle seat on an enlarged scale, with a part broken away;

FIG. 3 is a cross-section through the complete adjusting means, taken along the line III—III of FIG. 2;

FIG. 4 is a lateral elevation, partly broken away, showing the adjusting means of the articulated fitting according to the invention, seen from the side facing the interior of the motor vehicle seat;

FIGS. 5 and 7 show different positions of an arresting means for the adjusting device; and FIG. 8 is a plan view showing the operating knob of the hinge fitting, with the handle removed.

As can be seen from FIG. 1, the hinged fittings shown are adapted to be used in conjunction with motor vehicle seats or the like and permit of adjustment of the seat back to various positions. Of the seat itself, only the spring 10 and the seat frame 11 are shown. The seat back or part thereof have not been shown, for the sake of simplicity. It should however be mentioned that the seat back has a supporting framework which is strengthened by cross-pieces. It is possible also to construct the supporting frame as a U open on one side. In this case, the supporting frame consists of two upright members which are joined together by a crosswise member.

The seat of the motor vehicle has, on one side, an articulated or hinged fitting of a design to be described hereinafter, whilst on the other, opposite side, only a simple pivot bearing is provided.

The hinged fitting is generally designated 12 and consists essentially of two differently formed hinged parts 13 and 15. The pivot 43 of both hinge parts 13 and 15 is enclosed by a cross-member 17 which, see FIG. 1, extends as far as the other, opposite side of the seat, being accommodated there by a bearing pivot 74 of a pivot bearing 14. The cross-member 17 is hollow so that the bearing pivots 43, 74 can engage in the tubular openings from different directions. The hinge fitting 12, as seen from the driver's or other occupant's sitting position, disposed on the left of the vehicle seat and is provided with an adjusting and locking means, to be described in greater detail hereinafter. On the right-hand side of the vehicle seat is a simple pivot bearing 14 consisting merely of two arms 16, 19 connected in the manner of an ordinary toggle-lever, i.e. it has no adjusting or locking means.

The hinge part 15 of fitting 12 and arm 16 of pivot bearing 14 co-operate with the seat back, not shown, and are of substantially the same construction. They are provided with apertures which serve for attachment to the seat back or may also serve for marking purposes, namely if the seat back is to be connected to these parts by some other means, for example by welding.

The second arm 19 of the pivot bearing 14 is attached to the frame 11 at one end, for example by welding and, at the other end, has the aforementioned bearing pivot 74 which is equiaxial with the cross-member 17. The cross-member is, as already mentioned, of tubular shape in the embodiment under consideration, the tube engaging through the arm 16 and then co-operating with the aforesaid bearing pivot of the arm 19. It will be seen that, by this arrangement, pivoting of the arm 16 about the longitudinal axis through the cross-member 17 is possible. The arm 16 is rigidly connected to the cross-member 17. The fitting part 15 on the other side is likewise rigidly connected to the cross-member 17, for example by welding. The cross-member 17 engages through fitting part 15 and then cooperates with bearing pivot 43 which forms a part of the adjusting means, the construction of which will be described in detail hereinafter. It will be seen that, when the cross-member 17 is a rigid component, the two parts 15 and 16 are connected rigidly together. However, the cross-member 17 can also take the form of a torsion rod which is hollow at least at its ends, in order to allow accommodation of the bearing pivots, as already mentioned.

As FIG. 1 shows, the fitting part 13 of fitting 12, i.e. the part which accommodates the adjusting and locking means, is connected to the seat frame 11. Apertures 21 and 22 through which pass screws 18 are provided in fitting part 13, as can be seen particularly in FIGS. 2 to 4. These are secured in threaded holes in the seat frame 11 or may be secured by nuts.

Part 13 contains all the adjusting and locking means, representing the combination of a fine adjustment means with a free-pivoting means. The free-pivoting means is so formed that the seat back can be freely pivoted in both directions from any pre-selected seat back position, i.e. on the one hand, the free-pivoting means can be used to move the seat forwardly, in other words towards the dashboard of the vehicle, this position being the so-called entry position; on the other hand, the free-pivoting means allows the seat back to be moved through the selected sitting position and rearwardly until, in the extreme position, the seat is in the reclined position. The fine adjustment means can be infinitely variably set within a very wide annular range. The pre-selected and adjusted position of the seat back within the scope of the fine adjustment facility can, after prior use of the free-pivoting means—in fact independently of the direction of movement—automatically restored or, expressed differently; the seat back will always automatically return to the preset starting position.

Associated with hinge part 13 is a shell-shaped housing 20, the configuration of which can be seen particularly in FIGS. 3 and 4. The shell 20 substantially has the form of an elongated triangle provided with rounded corners, the edge of which, as can be seen particularly in FIG. 3, is raised.

The surrounding rim of the shell 20 is of substantially the same height all round, the height of the rim being reduced only in the region of a hand lever 55 which projects from the side of the shell.

The shell 20 is also used to connect the hinge part 13 to the seat frame 11. To make this possible, the aforementioned apertures 21 and 22 are provided which are in the region of a reinforcing plate 23 which is advantageous to stability. Aperture 21 is in the front point of the triangular shell 20 and is surrounded by a sleeve 24 which emerges from the inside of the shell 20 and which is sufficiently long that its free end face bears on the seat frame 11. In this way, the shell 20 and thus the adjusting means which it accommodates, is kept at a definite distance from the seat frame 11. As can be seen from FIG. 2, the sleeve 24 has an encircling groove in which engages the bifurcated end of the reinforcing plate 23. For further fitment, the sleeve 24 is welded both to the reinforcing plate 23 and to the shell 20. As already mentioned, hinge part 13 has a further aperture 22 so that it can be connected to seat frame 11 through a further screw 18. Aperture 22 is provided with a sleeve 25 which serves various purposes, which will be described in detail hereinafter.

If the seat back is to be adjusted in the aforesaid range of fine adjustment, it is necessary to turn an operating knob generally designated 26. Inside the operating knob 26 is a unilaterally self-locking coupling. So long as force is exerted from the direction of adjustment or from the seat back the self-lock is maintained on the coupling. If, on the other hand, force is exerted from the handle 36 of the operating knob 26, then the self-locking effect of the coupling is removed. In the first phase of movement of the handle 36, only the self-locking action of the coupling is relieved. Only after that does any further movement of the fine adjustment means and, with it, a movement of the seat back into a different position occur. This movement is infinitely variable. As will be indicated hereinafter, elimination of the coupling lock can be achieved by operating the handle 36 in both directions of rotation. Also, fine adjustment of the seat back— naturally within the framework of the envisaged limits— can occur both forwardly and rearwardly. The self-locking coupling consists of a brake bush 27. This is secured to the shell 20 by means of rivets 28, 28'. While the rivet 28 serves solely to fix the brake bush 27, rivets 28' are also used for joining further parts (to be described hereinafter in detail) of the adjusting means to the shell 20. Bearing against the inner wall of the brake bush 27 is a multicoiled spring 29, the ends 30 and 31 of which are inwardly bent in the manner of hooks (see FIG. 8). Coupling parts 32, 33 co-operate with these ends 30 and 31. Coupling part 32 is indirectly, i.e. through a bearing sleeve 34, accommodated non-rotatably on a pin 35 acting as an axle. Coupling part 33 on the other hand is freely rotatably mounted on the aforesaid pin 35, but is non-rotatably connected to the aforesaid handle 26.

Coupling parts 32 and 33 have two diametrically opposed dogs provided on their peripheral faces. As can be seen in FIG. 8, the dogs are only sufficiently wide that, in each case, on either side of the dogs of the opposite coupling part 32 or 33, a fairly large air gap is formed. The self-locking action is achieved in that the coil springs 29 bear with a certain pre-tension against the inner wall of the brake bush 27. Both ends 30 and 31 of the coil spring 29 act as detent projections against one of the two dogs of the coupling part 32. Coupling part 32 is, as already described, non-rotatably connected to the pin 35 from the direction of which, as will be described in greater detail hereinafter, the force flux from the seat back reaches the coupling via the adjusting means. One dog of the coupling part 32 is in the region between the two ends of the coil spring 29 so that always, in other words regardless of the direction of coupling part 32 is affected, the coil spring 29 is loaded in the widening sense. Therefore, the self-locking action of the coupling persists in each case, or the locking action is enhanced by the pressure arising. If, on the other hand, handle 36 is operated, then one side of one or other dog of the coupling part 33, according to the direction of rotation, abuts against one of the two ends 30 or 31 of the coil spring 29. With onward rotation of the handle 36 and, thus, of the coupling part 33, coil spring 29 is tightened up so that a reduction in diameter results and the windings of the coil spring 29 move away from the inner walls of the brake bush 27. This narrowing is sufficient to achieve disengagement between the coil spring 29 and the brake bush 27 so that free movement of the pin 35 becomes possible by means of the handle 36.

All further parts, except for the afore-described coupling of the adjusting means, are located inside the shell 20. The purpose of the pin 35 is to transmit, through the coupling, the movement undertaken by the operating knob 26 into the interior of the shell 20. Rim parts of an aperture through the shell 20 serve inter alia as a bearing for a sleeve 34 in which pin 35 is non-rotatably accommodated. That end of the sleeve 34 which is away from the operating knob 26 is provided with teeth.

This part, to be regarded as a gearwheel, is designated by the reference numeral 37. Gearwheel 37 meshes with a toothed segment 38 which, in its middle point in relation to the gear rim, is rotatably accommodated by a bearing 39. Bearing 39, in turn, is formed by a pin or spindle, both ends of which are mounted in respective swinging arms. The two swinging arms concerned comprise a larger swinging arm 40 which has to fulfill functions as yet to be described, and a smaller swinging arm 68, the sole purpose of which is to keep the bearing pivot 39 securely held. The two swinging arms 40 and 68 have one and the same point of rotation. However, they are held by different parts of the adjusting means. An inwardly bent rim 75 of the shell 20 serves as a bearing for the smaller swinging arm 68. Swinging arm 40, on the other hand, is accommodated by a hollow pivot 43 (bearing pivot). Hollow pivot 43 in turn engages around parts of bearing sleeve 67 and thus also pin 35. The last-mentioned parts are connected with one another rotatably so that the hollow pivot 43 also serves as a bearing for bearing sleeve 67 of pin 35. Additionally, a basket 44 which has an aperture, the rim portions of which engage in a groove in hollow pivot 43, serves for mounting purposes. Bearing basket 44 itself is secured to the inner wall of the shell 20 by a plurality of rivets, namely the aforementioned rivets 28'. Essential to the adjusting means within the range of the fine adjustment facility are, furthermore, a gearwheel 41 accommodated by the bearing pivot 39 which connects together the two swinging arms 40 and 68, and a serrated arc 42 which is rigidly associated with the shell 20 by means of rivets. Serrated arc 42 has internally cut teeth which lie on an arc, the midpoint of which is the pivot point of the two swinging arms 40, 68, namely the pin 35. Gearwheel 41 is rotatably held by the bearing pivot 39, in fact being located between the two swinging arms 40 and 68.

Those parts of the adjusting means which have so far been described form a first assembly of component parts of the said adjusting means by which it is possible to achieve a fine adjustment of the seat back. When the operating knob 26 is moved, the pin 35 is moved in the same direction of rotation via the coupling, the function of which has already been described. The pin 35 for its part drives the bearing sleeve 67 which is non-rotatably connected to it and, thus, the serrated portion 37 thereof. The latter engages with toothed segment 38 so that the same performs a pivoting movement about its bearing, in other words about the pivot 39. The actual bearing for the toothed segment 38 is the gearwheel 41 which is held directly by bearing pivot 39. Toothed segment 38 and gearwheel 41 are connected rigidly together. Therefore, gearwheel 41 is compelled to perform the same angular movement as is imparted to the toothed segment 38 by gearwheel 37. Since, on the other hand, gearwheel 41 meshes with serrated arc 42, gearwheel 41 rolls on serrated arc 42. As a function therefore, swinging arms 40 and 68 perform an angular movement about their pivot point, pin 35, or the associated bearing pivot 43. As will be described in greater detail hereinafter, this movement is then utilised in order to move the seat back within the scope of fine adjustment.

So far, it has only been said that the coupling which has already been described and which is accommodated in the operating knob 26 also serves to accommodate the forces arising from the back of the seat. Hereinafter, then, further means will be indicated which serve to absorb these forces. In fact, the means referred to are a brake to which also parts of the swinging arm 40 belong. For this purpose, swinging arm 40 is arcuately shaped at its free end, the middle point of the said arc coinciding with the pivot point of swinging arm 40. The arcuate end of swinging arm 40 is designated by the reference numeral 45 and is clamped portionwise between a braking element generally designated 46. The said braking element 46 is composed of a plurality of disc-shaped members all of which are arranged on the aforesaid bearing sleeve 25. The discs comprise two discs 47 made from a synthetic plastics material, preferably from a polyamide, which grip the free end 45 of the swinging arm between them, portionwise. One of the two discs 47 has a side face bearing on the reinforcing plate 23. The disc 47 disposed on the other side of the swinging arm 40 is accommodated by bearing sleeve 25, a spacer 48 being interposed. Spacer 48 is not circular but has a segment removed on one side. Into this free space so formed engage parts of swinging arm 40 so that the aforesaid clamping is achieved between the two discs 47. Spacer 48 is somewhat less in thickness than is the swinging arm 40 so that the discs 47 can rest firmly against the associated surfaces of swinging arm 40. In this way, a flat application of the discs 47, made from resilient material (polyamide) is achieved. In the embodiment in question, application pressure is achieved by using a conical disc 49 made from a more highly resistant material than the discs 47. Conical disc 49 has one end face bearing on the metal disc 50 which, like all the other discs, is held by the bearing sleeve 25. The disc 50 is secured in its position by a bifurcated clip 51, parts of which in turn engage in a groove around bearing sleeve 25. By reason of the elements co-operating with it, the conical disc 49 is kept pre-stressed.

As has already been mentioned briefly, the rotary movement of swinging arm 40 is utilised in order to pivot hinge part 15 for the seat back about its bearing, namely about the hollow pivot 43. In order to achieve this, swinging arm 40 has associated with it a hook-shaped arm 52 which is pivotally mounted and which, as will be described in detail hereinafter, is loaded by a traction spring. The direction of loading of the arm 52 is selected so the hook 53, integral therewith, engages in a recess 54 of hinge part 15 which is adapted to the hook shape. It should be mentioned that, when the swinging arm 40 is performing one of the two reciprocating movements hook 53 of arm 52 is entrained with it. Thus, hook 53 moves the hinge part 15 in a manner still to be described. The co-operation of hook 53 and hinge part 15 is favoured by the hinge part 15 being shaped as a double-armed lever. As already mentioned, its bearing is the hollow pivot 43. In all positions of the fine adjustment facility, hook 53 of arm 52 remains in the recess 54 in the hinge part 15. In the illustrated embodiment of the invention, an angular range of some 26° is chosen as the fine adjustment range.

In order, then, to be able to move the back of the seat into one of the two aforementioned free-pivoting ranges, it is necessary to disengage the hook 53 of arm 52 from the hinge part 15. To make this possible, a hand lever 55 is provided which has the same pivoting point, namely a bearing 56, by means of which the arm 52 is mounted on the swinging arm 40. Furthermore, arm 52 is rigidly connected to hand lever 55. In the embodiment, this is achieved by two rivets 57. As is shown particularly in FIG. 4, hand lever 55 has the form of an angled lever. The smaller arm of the angled hand lever is attached to the arm 52. It can be seen that, by pivoting the free end of the hand lever 55 in a counter-clockwise direction the hook 53 of the arm 52 can be disengaged from the hinge part 15. After being so disengaged, it is readily possible freely to pivot the seat back.

Arm 52 is loaded by a spring 60 which tends to pull the hook 53 into the recess 54. Certainly, spring 60 does not immediately engage the arm 52. It is rather more than the case that hand lever 55 has, at right-angles to its face, a pin member 58, the free end of which passes through a slot 59 in swinging arm 40. The free end of the coil spring 60 is fixed on the one hand to the pin member 58 and on the other to an eyelet 61 which is integral with the swinging arm 40 and bent outwards at right-angles from the base of swinging arm 40.

The individual movements will now be described with reference to FIGS. 5 to 7, initially assuming that the seat back is to be freely pivoted into the forward, in other words the entry position. To make this possible, hand lever 55 is pivoted against the action of coil spring 60. Arm 52 thereby performs a rotary movement in the same direction, namely counter-clockwise. During this movement, hook 53 of arm 52 disengages from the recess 54 in hinge part 15. In the first phase of the movement, a position is reached which is shown in FIG. 5. The outcome is that arm 52 comes to rest on a rocker 69 which is loaded by a traction spring 65. Thus, the operator of the hand lever meets a perceptible resistance. If, now, the seat back is to be moved forwardly, in other words into the entry position, so the resistance of the spring-loaded rocker 69 is not overcome. On the other hand, the distance by then travelled by the arm 52 is sufficient to pivot the hinge part 15 in a clockwise direction. As can be seen in FIG. 5, a shorter projection 62 on hinge part 15 can pass below the hook 53 of arm 52. Hinge part 15 can only be pivoted until such time, as is shown in FIG. 6, a further projection 64 on hinge part 15 abuts against one side wall of hook 53. When the seat back is pivoted backwardly, i.e. when the hinge part 15 is moved anti-clockwise, the rear sloping face of projection 62 is surmounted by hook 53 due to the force provided by the spring 60. The backward-pivoting movement continues until the hook 53 and recess 54 coincide. Then, by virtue of the loading spring, hook 53 is drawn again into recess 54. This terminal position corresponds to the pre-selected position in the fine adjustment range.

If, on the other hand, the back of the seat is to be moved into a rearward position, for example into the so-called reclining position, then it is necessary to pivot the hook 53 farther from the hinge part 15, in fact so far that, as is shown in FIG. 7, it can pass under a longer projection 63 on hinge part 15. In order to move the hand lever 55 and, with it, the arm 52 so far, the position already described with reference to FIG. 5 must first be reached in which the arm 52 abuts against rocker 69. Now, however, pivoting of the arm is not completed: a further movement of the arm 52 in the same direction of rotation must follow, against the resistance of the spring-loaded rocker 69. This latter is pivoted downwardly. This position is illustrated in FIG. 7. With this position of the arm 52 of its hook 53, it is possible to pivot hinge part 15 and, with it, the seat back, in both directions, in other words also rearwardly. Hook 53 can pass by the longer projection. The rearward pivoting movement is not limited by a projection or the like; rather more, the seat back is moved sufficiently far to bear on the rear seat of the vehicle. The forwards pivoting of the seat back from this reclined position to the previously selected sitting position is achieved in that the seat back is gripped by hand and moved freely into the pre-set sitting position. At the end of this pivoting movement, hook 53 of the arm 52 is moved into its starting position by its own spring and by the spring 65 of the rocker 69, whereupon the said hook 53 engages in the recess 54.

As is shown in FIG. 3, coupling of the hinge fitting 12 to the tubular cross-member 17 is achieved by a so-called impulse coupling. To make this possible, an encircling groove 70 in the pivot bearing 43 is utilised; into the same engages a pin 71 held by a leaf spring 73 secured by a rivet 72 to the cross-member 17 and extending in the longitudinal direction of the cross-member 17 in a bore. It can be seen that, through this impulse coupling arrangement, simple connection of the cross-member 17 to the hinge part 13 of hinge 12 is provided. When the coupling is inserted, pin 71 moves on sloping faces on the end face of the pivot bearing 43, overruns the outer periphery and then engages into the groove 70 of pivot 43. To release the inserted coupling, it is only necessary to raise leaf spring 73 sufficiently for the pin 71 to be lifted out of groove 70. Hinge part 13 can then be freely withdrawn.

As already mentioned, the embodiment described is only an exemplary realisation of the invention and is not limited thereto. Instead, many other embodiments and applications are possible. For example, the shape and arrangement of the seat frame and seat fitting can be other than described. Also, the component parts of the adjusting means may differ from the embodiment; for example, the additional brake may be omitted. Also, a different type of self-locking coupling may be chosen, for example a so-called cone coupling. Also, it is possible to limit various movements of parts of the adjusting means as regards limit positions, by using stops. For example, the toothed segment may be limited by stops on one or on both sides. Finally, the hand lever may have parts which abut against stops and so be limited in one or even possibly in both directions of movement.

We claim:

1. A seat, particularly a motor vehicle seat, having a seat portion, a seat back and means for adjusting the relative angular position of said seat back with respect to said seat portion, the seat portion and seat back each having a frame and said frames being connected at one side by a bearing and at the other side by the adjusting means, said adjusting means comprising:
   (a) a two-part hinge fitting;
   (b) locking means adapted to lock two parts of said hinge fitting against relative displacement;
   (c) first operating means adapted to actuate said locking means to release said hinge fitting parts and permit said seat back to be freely pivotable with respect to said seat portion between a downturned and a substantially upright position;
   (d) means adapted to re-engage automatically the locking means, after said locking means have been released, when said seat back is pivoted from said downturned to said substantially upright position with respect to said seat portion;
   (e) fine adjusting means adapted to adjust the relative angular position of said seat back with respect to said seat portion in said substantially upright position thereof; and
   (f) second operating means for operating said fine adjusting means.

2. A seat as claimed in claim 1, in which said adjusting means include a pivotable swinging arm carrying said locking means and a gearwheel, said gearwheel co-operating with a toothed segment and with a stationary serrated arc and said toothed segment being pivotable through a fine adjustment gearwheel.

3. A seat as claimed in claim 2, in which the swinging arm is loaded by a spring, said spring serving to hold the locking means in the locked position when said seat back is in the substantially upright position with respect to said seat portion.

4. A seat as claimed in claim 3, in which one end of said spring is attached to an angled eyelet on the swinging arm, the other end of said spring being attached to a pin member mounted on the first operating means, said pin member passing through an elongated hole in said swinging arm.

5. A seat as claimed in claim 2, in which during free pivoting of said seat back into a reclined position, said locking means pivots a rocker mounted on the swinging arm, said rocker being loaded by a spring.

6. A seat as claimed in claim 2, in which said gear wheel is mounted on a pin member, one end of said pin member being held by said swinging arm and the other end of said pin member being held by a second swinging arm spaced from and substantially parallel to said first swinging arm.

7. A seat as claimed in claim 6, in which said adjusting means is enclosed by a shell member, the inner wall of said shell member having a raised rim and said second swinging arm being pivotally mounted on the said raised rim.

8. A seat as claimed in claim 2, in which part of said swinging arm is adapted for use as part of a brake.

9. A seat as claimed in claim 8, in which said hinge fitting is mounted on a bearing sleeve, two discs being disposed on said bearing sleeve and clamping therebetween the said part of said swinging arm.

10. A seat as claimed in claim 9, in which the two discs are spaced from each other by a spacer, the thickness of said spacer being less than that of the said part of said swinging arm.

11. A seat as claimed in claim 10, in which a preferably conical resilient member is disposed on one side of one disc, a retaining member serving to keep said resilient member in a pre-stressed condition and a rigid disc being interposed between said resilient member and said retaining member.

12. A seat as claimed in claim 2, in which said swinging arm is pivotally mounted on a pivot bearing of the two parts of said hinge fitting.

13. A seat as claimed in claim 1, in which said locking means co-operate directly with one part of the two-part hinge fitting.

14. A seat as claimed in claim 13, in which said hinge part has a recess in which said locking means can engage.

15. A seat as claimed in claim 14, in which said locking means include a lever having a hook-shaped end, said end being adapted to engage in said recess in the locked position.

16. A seat as claimed in claim 14, in which projections of different length are arranged on opposite sides of said recess.

17. A seat as claimed in claim 16, in which a further projection is provided on the side of the shorter projection remote from the recess, said further projection serving as an abutment for said locking means.

References Cited

UNITED STATES PATENTS

| 2,784,770 | 3/1957 | Herr | 297—367 |
| 2,912,045 | 11/1959 | Milly | 297—363 |
| 3,044,830 | 7/1962 | Kolle | 297—361 |
| 3,051,526 | 8/1962 | Werner et al. | 297—367 |
| 3,099,485 | 7/1963 | Beierbach et al. | 297—373 |
| 3,156,004 | 11/1964 | Strien et al. | 297—367 X |
| 3,259,433 | 7/1966 | Werner | 297—367 |

FOREIGN PATENTS

| 1,094,608 | 12/1960 | Germany. |
| 1,127,731 | 4/1962 | Germany. |
| 1,157,496 | 11/1963 | Germany. |

DAVID J. WILLIAMOWSKY, *Primary Examiner.*

FRANK B. SHERRY, *Examiner.*

F. O. FINCH, *Assistant Examiner.*